United States Patent [19]

Tokarz

[11] 4,414,177

[45] Nov. 8, 1983

[54] LIQUID LEVEL, VOID FRACTION, AND SUPERHEATED STEAM SENSOR FOR NUCLEAR REACTOR CORES

[75] Inventors: Richard D. Tokarz, West Richland,

[73] Assignee: The United States of America as represented by the U.S. Department of Energy, Washington, D.C.

[21] Appl. No.: 315,379

[22] Filed: Oct. 27, 1981

[51] Int. Cl.³ ............................................. G21C 17/00
[52] U.S. Cl. ..................................... 376/247; 376/258
[58] Field of Search ....................... 376/216, 247, 258; 73/1 H, 447, 290 R, 295, 299, 291

[56] References Cited

U.S. PATENT DOCUMENTS

| | | | |
|---|---|---|---|
| 3,247,069 | 4/1966 | Powell et al. | 376/216 |
| 3,561,406 | 2/1971 | Rupprecht | 376/247 |
| 3,638,018 | 1/1972 | Gasper | 376/247 |
| 4,050,418 | 9/1977 | Watanabe | 376/247 |
| 4,322,267 | 3/1982 | Kinoshira et al. | 376/216 |

FOREIGN PATENT DOCUMENTS 1039044  8/1966  United Kingdom ................ 376/247

*Primary Examiner*—Sal Cangialosi
*Attorney, Agent, or Firm*—Robert Southworth, III; Richard E. Constant; Richard G. Besha

[57] ABSTRACT

An apparatus for detecting nominal phase conditions of coolant in a reactor vessel comprising one or more lengths of tubing each leading from a location being monitored to a closed outer end exterior of the vessel. Temperature is sensed at the open end of each length of tubing. Pressure within the tubing is also sensed. Both measurements are directed to an analyzer which compares the measured temperature to the known saturated temperature of the coolant at the measured pressure. In this manner, the nominal phase conditions of the coolant are constantly monitored.

5 Claims, 1 Drawing Figure

LIQUID LEVEL, VOID FRACTION, AND SUPERHEATED STEAM SENSOR FOR NUCLEAR REACTOR CORES

The United States Government has rights in this invention pursuant to DOE Contract DE-AC-06-76RLO 1830.

TECHNICAL FIELD

This disclosure relates to an apparatus for monitoring the presence of coolant in liquid or mixed liquid and vapor, and superheated gaseous phases at one or more locations within an operating nuclear reactor core, such as pressurized water reactor or a boiling water reactor.

BACKGROUND ART

There exists a need for systems capable of detecting the proximate phase of coolant flow in a reactor core, and for instruments capable of detecting liquid level in the core. United States governmental regulations specify "thermal hydraulic" measurement capabilities in all operating power reactors. These needs and requirements are the result of the TMI accident.

During such an "event" in a pressurized water reactor, there might be a period during which the reactor pressurizer will overfill with water while the primary pumps are operating. The reactor coolant may be in two-phase flow through the coolant loop and might have a significant void fraction. At the present time, the reactor operator has no instrumentation which would indicate a void fraction or liquid level exists in the core. If the pumps are shut off, the void fraction in the coolant will separate, exposing a portion of the core. Because of the unavailability of monitoring systems for either of these conditions, the operators of the reactor may be unaware of these conditions until serious damage results to the core itself.

The present system is designed to provide continuous monitoring of coolant conditions at one or more locations within an operating reactor vessel. It can be used to determine the nominal coolant phase at a designated location.

DISCLOSURE OF THE INVENTION

The apparatus comprises a length of small diameter tubing having an open end positioned within the coolant at the location to be monitored. The tubing leads through the vessel or pipe walls to its exterior to deliver pressurized coolant from its open end. The exterior end of the length of tubing is closed.

A temperature sensing device, such as a thermocouple, is mounted at the open end of the length of tubing. Leads from it extend through the tubing to the exterior of the vessel. A pressure sensing device, such as a pressure transducer, is operably connected to the interior of the tubing at a location exterior to the vessel. Since discernible temperature differences exist between liquid and superheated gaseous phases of coolant at reactor vessel pressures, and the saturated temperature is well defined for any given pressure, an indication of the coolant phase condition can be obtained by comparing the measured liquid temperature to the measured pressure.

These two measured parameters are compared to pressure and temperature tables inserted in a programmable memory. The measured pressure is utilized to select a set of temperatures from the memory which are compared to the measured temperature. Because the liquid temperature doesn't change at T saturation, this device cannot recognize these changing phase conditions. To obtain a usable readout from this device the output must be divided into three categories: (1) T measured is below T saturation = output reading normal liquid, (2) T measured is above T saturation but below some preselected superheated steam temperature (say T saturation + 5° F.) = output reading interpreted as possible void fraction, and (3) T measured is above T saturation + 5° F. = output reading indicated the presence of superheated steam, therefore, liquid level is below sensing location. This can be accomplished by a properly programmed analyzer with readout capability or annunciators for indicating the condition of the coolant at the monitored location.

By using a multiple number of lengths of tubing with open ends incrementally spaced at different elevations, one can then monitor coolant level.

BRIEF DESCRIPTION OF THE DRAWING

The drawing schematically illustrates the apparatus for monitoring coolant conditions.

BEST MODE FOR CARRYING OUT THE INVENTION

Figure 1:
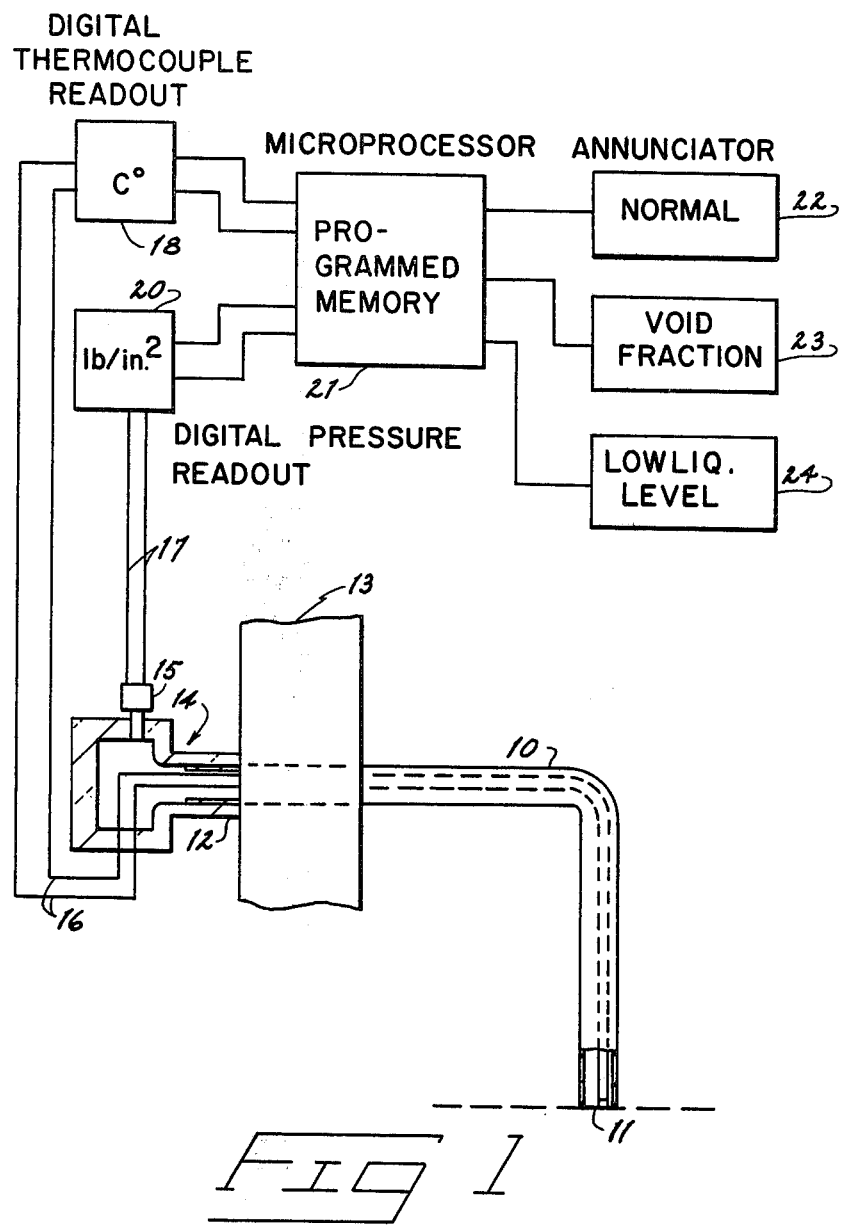

The drawing illustrates a single length of tubing in the system. It is to be understood that the system will normally consist of a multiplicity of such tubes. Each would monitor a different sensing elevation within a reactor vessel.

The length of small diameter metal tubing 10 within the pressurized vessel has an open end 11 at the sensing location where the condition of coolant is to be monitored. The tubing is brought out of the vessel to its exterior. This will be typically accomplished by a welded vessel penetration through a wall section 12. The portion of the length of tubing 10 exterior to the vessel walls 12 is shown as being wrapped in insulation 13, which prevents cooling of the liquid.

The exterior or outer end of the length of tubing 10 is closed, and while liquid and/or gaseous coolant might enter it, no coolant flows through the length of tubing. As generally illustrated in the drawings, the tubing would lead to an insulated housing 14 which mounts a pressure transducer 15 capable of producing signals as a function of the pressure sensed within housing 14. The transducer 15 is operably connected to the interior of the length of tubing 10, and pressure sensed by it will be identical to the pressure at the open end 11, less the static head difference, which can be electronically compensated.

The thermocouple leads 16 are preferably brought from the interior of the vessel through the interior of the length of tubing 10. The leads 16 and leads 17 from the pressure transducer 15 are preferably directed to temperature and pressure readout devices shown respectively at 18 and 20. The sensed signals are fed to an analyzer 21, which might be a microprocessor programmed to compare the magnitude of each signal to known values representing saturated temperatures of the coolant at the measured pressures.

Any desirable output can be obtained from the analyzer 21. As an example, it might be provided with annunciators 22, 23, and 24 which respectively signal normal coolant conditions, abnormal void fraction conditions, and low liquid level.

During normal use of the reactor with the coolant pumps operable, the appratus would provide constant measuring of temperature and pressure within the vessel interior. When either the temperature or pressure measured by the apparatus exceeds the programmed limits, the system will annunciate to indicate a possible condition of two-phase flow. If the analyzer determines that superheated steam exists at the open end 11 of the length of tubing 10, the annunciator 24 would indicate that liquid level has dropped below the elevation of the open end 11.

This system is also capable of sensing liquid level by placing the open ends 11 of a number of lengths of tubing 10 at incremental elevations within the vessel to be monitored. If the primary reactor coolant pumps are turned off, the void fraction flow that commonly occurs within the reactor vessel will separate. As the liquid coolant level falls below the open end 11 of each length of tubing 10 the sensed temperature and pressure values for that individual length of tubing 11 will become superheated steam. This will be recognized by the analyzer 21 and indicated by annunciator 24. By relating this condition to the known elevation of the open end 11, liquid level can be accurately determined.

Practical utilization of this system in a reactor core requires space availability, as well as physical access into the vessel and associated piping. Current design of boiling water and pressurized water reactors have sufficient vertical space in their cores for ten to eighteen sensing lines comprising lengths of tubing as generally discussed. It appears practical to transition such lines out of the vessel through the existing borate injection standpipe or other possible locations, such as flange fittings.

When designing the apparatus, it is necessary to assure an adequately prompt response to void fractions caused by rapidly dropping pressure because of voiding in the length of tubing 10. Since the system is designed for detection of small and medium break loss of coolant accidents, there should not be a rapid drop in coolant loop pressure. However, if these were to occur, the pressure transducer 15 would reduce erratic and dropping pressure readings. The analyzer 21 can be programmed to activate the appropriate annunciator when such conditions occur. The problem of response time could be eliminated completely by sizing the interior of the length of tubing 10 sufficiently large to preclude slug-flow effects. In other words, the inside diameter of the tubing would be sufficiently larger that the surface tension of the liquid fluid within the length of tubing would be insignificant and not impede fluid flow, whether the coolant is at a gaseous or liquid state. Another approach to this condition would be to backfill the sensing tube with inert gas and use a movable plug to separate the gas backfill from the reactor fluid.

I claim:

1. A phase monitoring apparatus for coolant within a pressurized nuclear reactor vessel, comprising:

a length of small diameter tubing having an open end within the vessel at a preselected location, said length of tubing being extended to the exterior of the vessel;

temperature sensing means positioned at the open end of the length of tubing for measuring the temperature of coolant at said preselected location;

pressure sensing means exterior of the vessel and operably connected to the interior of the length of tubing for measuring the pressure of coolant at said preselected location;

and means operably connected to said pressure sensing means and to said temperature sensing means for comparing the measured temperature to the known saturated temperature of the coolant at the pressure measured by said pressure sensing means, whereby the phase condition of coolant at said preselected location can be determined.

2. An apparatus as set out in claim 1 wherein the temperature sensing means comprises a thermocouple fixed to the open end of the length of tubing.

3. An apparatus as set out in claim 1 wherein the temperature sensing means comprises a thermocouple fixed to the open end of the length of tubing;

the thermocouple having leads extending through the length of tubing to the exterior of the vessel.

4. An apparatus as set out in claim 1 wherein the pressure sensing means is located exterior to the vessel.

5. An apparatus as set out in claim 1 wherein the pressure sensing means is located exterior to the vessel and the length of tubing is thermally insulated from the vessel to said pressure sensing means.

* * * * *